United States Patent
Kemp et al.

[11] Patent Number: 5,984,390
[45] Date of Patent: Nov. 16, 1999

[54] FRONT BUMPER ENERGY ABSORPTION AND MANAGEMENT SYSTEM

[75] Inventors: Ronald S. Kemp, Oxford; Paul R. Corby, Rochester Hills; Michael W. Cetnar, Macomb; Ralph L. Beaufait, New Baltimore; Shivram Pattabiraman, Troy, all of Mich.

[73] Assignee: Chrysler Corporation, Auburn Hills, Mich.

[21] Appl. No.: 08/944,814

[22] Filed: Oct. 6, 1997

[51] Int. Cl.[6] .................................................. B60R 19/04
[52] U.S. Cl. .......................................... 293/132; 293/133
[58] Field of Search ................................... 293/133, 132, 293/109, 136; 296/189

[56] References Cited

U.S. PATENT DOCUMENTS

| | | | |
|---|---|---|---|
| 3,412,628 | 11/1968 | De Gain | 74/492 |
| 3,721,433 | 3/1973 | Sobel. | |
| 4,079,975 | 3/1978 | Matsuzaki et al. | 293/132 |
| 4,278,282 | 7/1981 | Roubinet et al. | 293/132 |
| 4,410,208 | 10/1983 | Mulso, Jr. et al. | 293/132 |
| 4,413,856 | 11/1983 | McMahan et al. | 293/132 X |
| 5,201,912 | 4/1993 | Terada et al. | 293/132 X |
| 5,772,267 | 6/1998 | Heim et al. | 293/132 X |

*Primary Examiner*—D. Glenn Dayoan
*Assistant Examiner*—Lori L. Coletta
*Attorney, Agent, or Firm*—James R. Lee

[57] ABSTRACT

An energy absorption and management system for a motor vehicle includes a bumper interconnected to the vehicle frame through a pair of substantially identical energy absorbing assemblies or bumper brackets. Each assembly includes an outer portion and an inner portion. The outer portion has a pair of spaced apart sides which are interconnected through an arcuate segment. The inner portions are preferably stepped in a longitudinally extending direction such that they include first and second substantially horizontal segments which are vertical spaced from one another. If the motor vehicle is involved in a frontal impact of a predetermined speed, energy is absorbed and managed through deformation of the outer and inner portions. Deformation of the outer portion is controlled by the inner portion which is welded or otherwise fixedly attached thereto at spaced apart points.

19 Claims, 3 Drawing Sheets

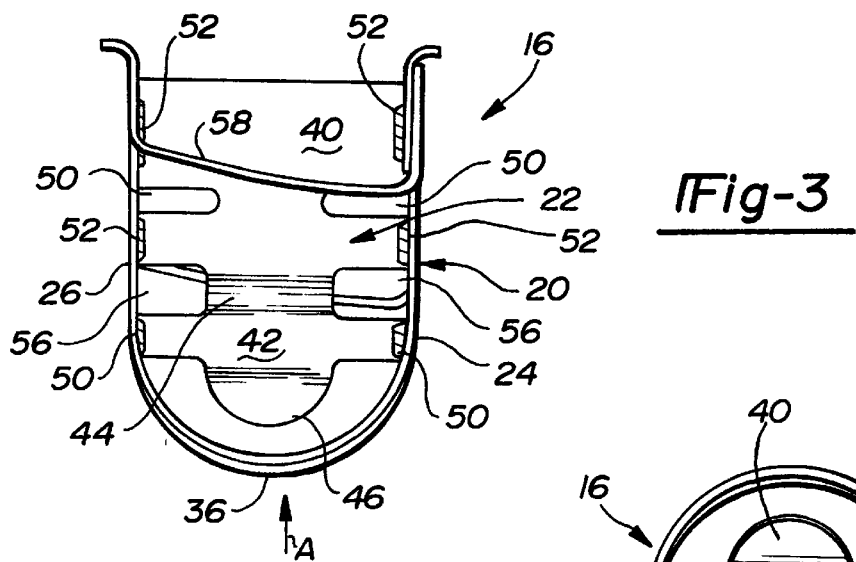
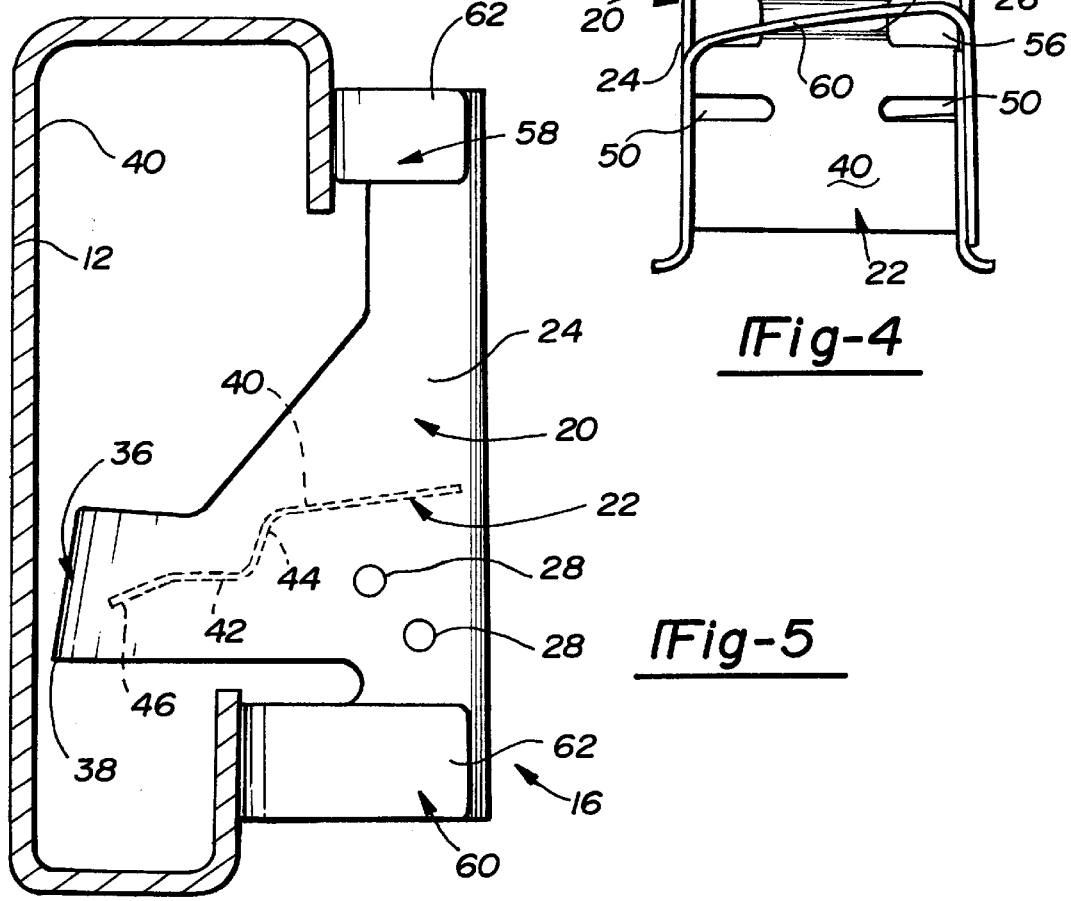

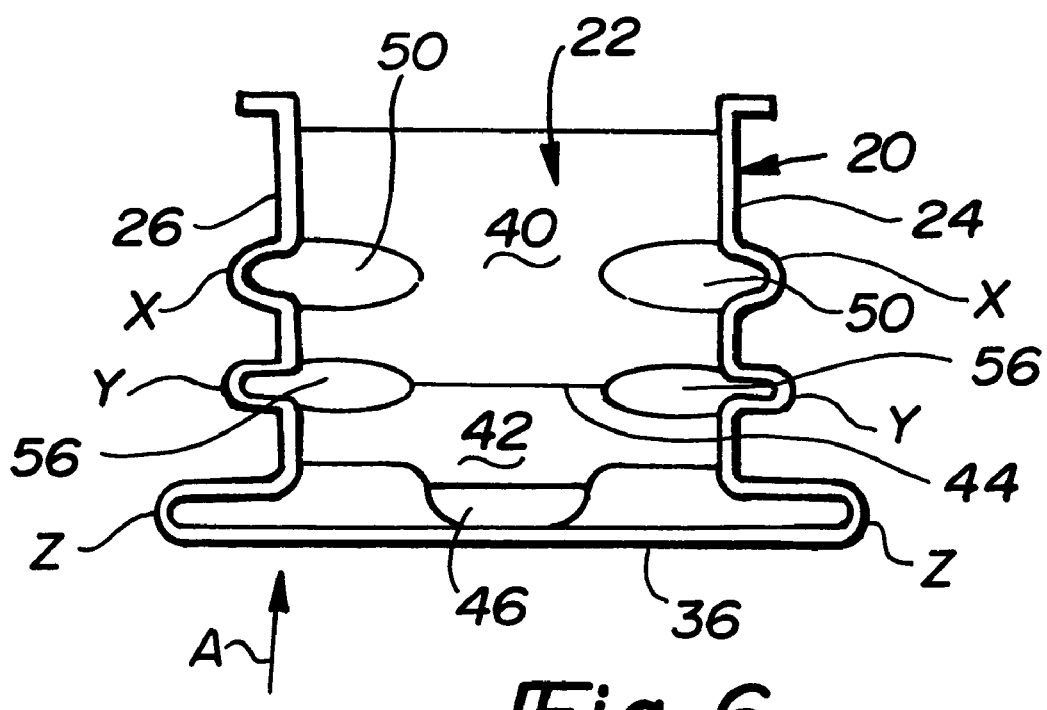

FRONT BUMPER ENERGY ABSORPTION AND MANAGEMENT SYSTEM

BACKGROUND OF THE INVENTION

1. Technical Field

The present invention generally relates to motor vehicles. More particularly, the present invention relates to an energy absorption and management system for a vehicle bumper.

2. Discussion

Various devices have been proposed for absorption energy. An example of such prior art is shown in U.S. Pat. No. 3,412,628 to DeGain which teaches a structural member adapted to remain rigid when subjected to forces below a predetermined magnitude and collapse and absorb energy when forces in excess of the predetermined magnitude are imposed on it. The structural member is formed of sheet steel and has an elongated tubular configuration. A series of regularly spaced radial rings of reduced thickness are disposed along the length of the tube and the tube is bent at the rings so that alternate rings are expanded to a larger diameter than the intermediate rings. Longitudinal slits or cut-outs extend across the outwardly expanded tube sections.

Another example of an energy absorbing structure is shown in U.S. Pat. No. 4,410,208 to Mulso, Jr. which discloses inner and outer members having a C-shaped configuration for absorbing energy during a vehicle collision. The outer member has a composite shape with one corrugated end portion fixed to a bumper assembly and its other C-shaped portion adapted for attachment to the vehicle frame.

While known devices for absorbing energy have proven to be acceptable for their intended uses, all are associated with disadvantages addressed by the present invention. In this regard, many devices are not suitable for sufficiently absorbing and managing energy from a vehicle impact within a limited amount of space. Additionally, many known devices are expensive to manufacture, time consuming to install, or both.

SUMMARY OF THE INVENTION

The present invention is directed to an apparatus which serves as a sacrificial energy absorption and management member and also serves to mount a bumper to the frame.

In one form, the present invention provides an apparatus for absorbing impact energy received in a generally longitudinal direction. The apparatus includes an outer portion and an inner portion. The outer portion has a pair of spaced apart sides extending in the longitudinal direction. The inner portion horizontally extends between the pair of spaced apart sides and is adapted to control deformation of the outer portion. The energy received in the generally longitudinal direction is at least partially absorbed through deformation of the inner and outer portions.

In a more preferred form, the present invention provides an impact absorbing arrangement for a motor vehicle. The impact absorbing arrangement includes a transversely extending bumper and a pair of substantially identical bumper mounting units. The substantially identical bumper mounting units are attached to the vehicle frame and extend therefrom. Each of the bumper mounting units has an outer portion and an inner portion. The outer portion of each unit has a pair of spaced apart sides extending in a substantially longitudinal direction. Each of the inner portions horizontally extends between its associated pair of spaced apart sides and is adapted to control longitudinal crush of the spaced apart sides during impact. When an impact force of a predetermined level is received by the bumper, the energy is absorbed through deformation of at least one of the pair of substantially identical bumper mounting units.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

FIG. 3 is a top view of the apparatus for absorbing and managing impact energy of the present invention.

FIG. 4 is a bottom view of the apparatus for absorbing and managing impact energy of the present invention.

FIG. 5 is a side view of the apparatus for absorbing and managing impact energy illustrated operatively associated with a simplified view of the bumper of FIG. 1 which is shown in section.

FIG. 6 is a top view similar to FIG. 3 showing the apparatus for absorbing and managing energy of the present invention after an impact.

DETAILED DESCRIPTION OF THE PREFERRED EMBODIMENT

Figure 1:
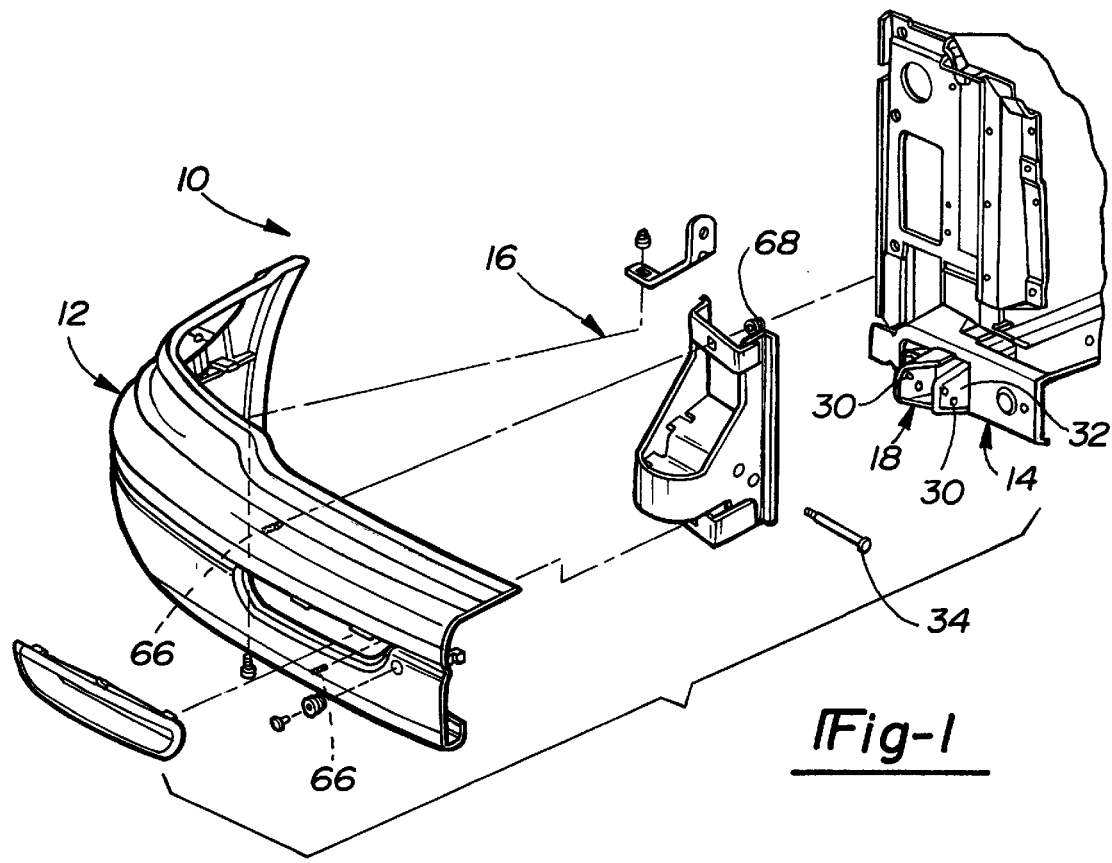
FIG. 1 is a perspective view of a portion of a motor vehicle incorporating an apparatus for absorbing and managing impact energy constructed in accordance with the teachings of a preferred embodiment of the present invention.
Figure 2:
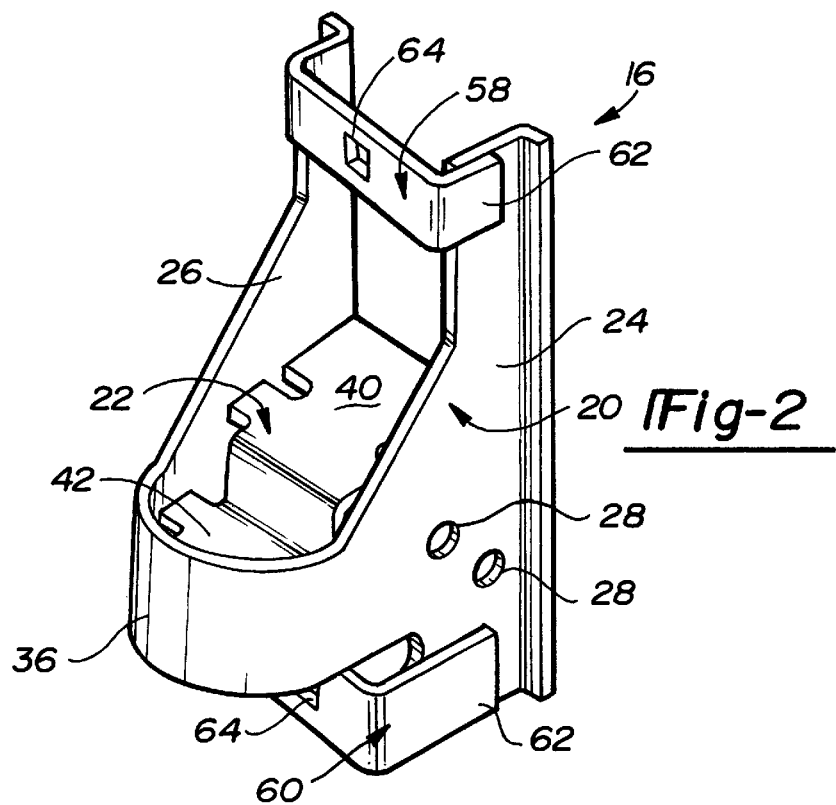
FIG. 2 is an enlarged perspective view of the apparatus for absorbing and managing impact energy of the present invention.

Referring to the partially exploded environmental view of FIG. 1 of the drawings, an energy absorption and management system for a motor vehicle constructed in accordance with the preferred embodiment of the present invention is generally identified at reference numeral 10. As will become apparent below, the system 10 of the present invention is primarily intended to provide a sacrificial energy absorption and management member. In the particular embodiment disclosed, the present invention also serves to mount a bumper 12 of a motor vehicle to the vehicle side rail 18.

As shown in FIG. 1, the energy absorption and management system 10 of the present invention includes a impact absorbing structural assembly 16 for attaching the vehicle bumper 12 to a longitudinally extending side rail 18 of the vehicle frame 14. It will be understood that the system 10 preferably includes two substantially identical assemblies or bumper mounts 16. FIG. 1 illustrates the assembly 16 associated with a right side of the bumper 12 and the right side rail 18. The system 10 is particularly adapted for use in vans and the like in which the space available between the bumper 12 and the occupant compartment for energy absorbing crush during a frontal impact is limited. However, it will be understood that the teachings of the present invention are widely applicable to any type of vehicle for reducing impact forces transferred to the vehicle interior.

With continued reference to FIG. 1 and additional reference to FIGS. 2–6, the assembly 16 of the present invention is shown to include an outer portion 20 and an inner portion 22. The outer portion 20 is illustrated to include a pair of spaced apart sides 24 and 26. In the exemplary embodiment illustrated, the sides 24 and 26 extend generally in a longitudinal direction and are parallel to one another. Mounting holes 28 are formed in each of the sides 24 and 26 and are intended to align with holes 30 provided in a plate 32 attached to the rail 18. A threaded fastener 34 passes through each of the holes 28, a corresponding hole 30 and engages a weld nut (not specifically shown). It will be understood that the assembly 16 may alternatively be welded or otherwise suitably fastened to the frame 14 of the vehicle.

The outer portion 20 of the assembly 16 further includes an arcuate segment 36 which interconnects the pair of spaced apart sides 24 and 26. In the exemplary embodiment, the arcuate segment 36 of the outer portion 20 is sloped such that a lower edge 38 is positioned closest to an inner side 40 of the bumper 12 (as shown in FIG. 5). Contact between the inner side 40 of the bumper 12 and the lower edge 38 is intended to initiate energy absorption and vehicle deceleration during a frontal impact.

The inner portion 22 of the assembly 10 horizontally extends between the pair of spaced apart sides 24 and 26 and is adapted to absorb impact energy through deformation and also control deformation of the outer portion 20 when the outer portion 20 receives an impact directed in a generally longitudinal direction. The inner portion 22 is stepped in a longitudinal extending direction such that it includes first and second substantially horizontal segments 41 and 42 which are vertical and horizontally spaced from one another (shown most clearly in FIG. 5). An intermediate segment 44 connects the first and second substantially horizontal segments 41 and 42. The inner portion 22 further includes a tip 46 forwardly and downwardly extending from the second horizontal segment 42. In the embodiment illustrated, the tip 46 is generally arcuate in shape.

In the exemplary embodiment, the first horizontal segment 40 of the inner portion 22 includes laterally extending slots 50 which are open at laterally extending sides of the first horizontal member 40. The slots 50 each extend across approximately ¼ to ⅓ of the width of the first horizontal segment 40. In the top view of FIG. 3, the remaining length of the laterally opposed sides of the first horizontal segment 40 are shown securely attached to the sides 24 and 26 through welds 52. By interrupting the attachments of the first horizontal segment 40 in a horizontal direction (i.e., the inner portion 22 is attached to the outer portion 20 at spaced apart points) and through incorporation of the slots 50, a first vertically extending crush zone X is defined in both of the first and second sides 24 and 26 adjacent the slots 50 (see FIG. 6).

The assembly 12 further preferably includes a second vertically extending crush zone Y in both of the first and second sides 24 and 26 and a third vertically extending crush zone Z located at opposite ends of the arcuate segment 36. The second crush zone Y is defined adjacent the intermediate portion 44 which has a reduced width. The reduced width of the intermediate portion 44 defines openings 56 between the first and second horizontal segments 40 and 42. The second horizontal segment 42 is attached at its laterally opposed sides to the outer member 20 with welds 52. The third crush zone Z is provided in the arcuate segment 36 of the outer member 20 immediately forward of the second horizontal segment 42.

The assembly 16 is further shown to include upper and lower mounting flanges 58 and 60 for interconnecting the assembly 16 with the bumper 12. In the embodiment illustrated, the upper and lower mounting flanges 58 and 60 are both generally U-shaped and are integrally formed to extend from the second side 26 of the outer portion 20. An end 62 of both the upper and lower mounting flanges 58 and 60 are welded or otherwise securely attached to the first side 24. The upper and lower mounting flanges 58 and 60 include apertures 64 adapted to receive carriage bolts 66 extending from an inner side of the bumper 12. The carriage bolts 66 are adapted to threadably engage nuts 68.

With particular reference to the top views of FIGS. 3 and 6, the operation of the system 10 of the present invention will be described. When the motor vehicle is involved in a frontal impact (e.g. a direct frontal impact, an offset impact or any other impact having a force with a longitudinally directed component), an impact force is transferred from the bumper 12 to one or both of the bumper mounts 16. The direction of impact force is generally indicated in FIGS. 3 and 6 with arrow A. The impact energy initially causes the third crush zones Z of the outer member 20 to bulge outward and the arcuate segment 36 to flatten, thereby at least partially absorbing the impact energy. If impact energy remains, the arcuate segment 36 is longitudinally forced rearwardly and its sloped orientation downwardly bends the tip 46 of the inner portion 22. Further energy is absorbed through deformation of the first and second crush zones X and Y and through bending of the intermediate segment 44 of the inner portion 22.

In one application, the inner and outer portions 20 and 22 of the bumper mount 16 are both constructed of steel having a minimum tensile strength of 60 ksi and a minimum thickness of approximately 3 mm. In this application, the first and second sides 24 and 26 have a height of approximately 12 inches, the first and second sides 24 and 26 are spaced apart approximately four inches and the horizontal distance between the lower edge 38 of the arcuate segment 36 and a rear edge of the first horizontal segment is approximately six inches. In this specific application, the bumper mounts 16 of the system 10 are adapted to begin to deform at a predetermined impact speed of approximately 3 to 5 miles per hour. It will be understood by those skilled in the art that the predetermined speed upon which the assemblies 16 begin deformation may be raised or lowered through changes to material thickness, steel type, dimensions of particular features, and the like.

While the above description constitutes the preferred embodiment of the invention, it will be appreciated that the invention is susceptible to modification, variation, and change without departing from the proper scope or fair meaning of the accompanying claims. For example, while the present invention is shown and described for use with a front bumper 12, the teachings are equally applicable for vehicle rear bumpers.

We claim:

1. An apparatus for absorbing impact energy directed in a generally longitudinal direction, the energy absorbing structural assembly comprising:

an outer portion having a pair of spaced apart sides extending in a substantially longitudinal direction;

and an inner portion horizontally extending between said pair of spaced apart sides, said inner portion being fixedly attached to each of said pair of spaced apart sides of said outer portion at horizontally spaced apart points so as to define at least one vertically extending crush zone in each of said pair of spaced apart sides between adjacent spaced apart points;

whereby said inner portion controls deformation of said outer portion and the energy received in the generally longitudinal direction is at least partially absorbed by deformation of said inner and outer portions and said outer portion further includes an arcuate seament interconnecting said pair of spaced apart sides, said arcuate seament being adapted to deform when the impact energy is received thereby and transfer a portion of the impact energy to said inner portion.

2. An apparatus for absorbing impact energy directed in a generally longitudinal direction, the energy absorbing structural assembly comprising:

an outer portion having a pair of spaced apart sides extending in a substantially longitudinal direction; and an inner portion horizontally extending between said pair of spaced apart sides, said inner portion being fixedly attached to both of said pair of spaced apart sides of said outer portion at horizontally spaced apart points so as to define at least one vertically extending crush zone in each of said pair of spaced apart sides between adjacent spaced apart points;

whereby said inner portion controls deformation of said outer portion and the energy received in the generally longitudinal direction is at least partially absorbed by deformation of said inner and outer portions; and wherein said inner portion is stepped in a longitudinally extending direction such that said inner portion includes first and second substantially horizontal segments vertically spaced apart from one another.

3. The apparatus for absorbing impact energy directed in a generally longitudinal direction of claim 2, wherein said inner portion further includes an intermediate segment interconnecting said first and second substantially horizontal segments.

4. The apparatus for absorbing impact energy directed in a generally longitudinal direction of claim 3, wherein said intermediate segment is spaced apart from both of said spaced apart sides.

5. The apparatus for absorbing impact energy directed in a generally longitudinal direction of claim 4, wherein said inner portion further includes tip forwardly and downwardly extending from said second horizontal portion.

6. The apparatus for absorbing impact energy directed in a generally longitudinal direction of claim 2, wherein said first substantially horizontal segment is fixedly attached to each of said pair of spaced apart sides at two spaced apart points so as to define a first vertically extending crush zone in each of the pair of spaced apart sides, and further wherein said first horizontal segment is formed to include first and second slots transversely extending from adjacent said first vertically extending crush zone in each of the pair of sides.

7. An impact absorbing structural assembly for a motor vehicle having a longitudinally extending rail and a bumper, the impact absorbing structural assembly comprising:

an outer portion having a pair of spaced apart sides extending in a substantially longitudinal direction, each of said pair of spaced apart sides adapted to be fixedly interconnected to the longitudinally extending rail; and an inner portion horizontally extending between said pair of spaced apart sides, said inner portion being fixedly attached to each of said pair of spaced apart sides of said outer portion at horizontally spaced apart points so as to define at least one vertically extending crush zone in each of said pair of spaced apart sides between adjacent spaced apart points;

wherein said outer portion further includes an arcuate segment interconnecting said pair of spaced apart sides, said arcuate seament being adapted to deform when the impact energy is received thereby and transfer a portion of the impact energy to said inner portion and whereby the energy received from said generally longitudinally directed impact is at least partially absorb by deformation of said inner and outer portions.

8. An impact absorbing structural assembly for a motor vehicle having a longitudinally extending rail and a bumper, the impact absorbing structural assembly comprising:

an outer portion having a pair of spaced apart sides extending in a substantially longitudinal direction, each of said pair of spaced apart sides adapted to be fixedly interconnected to the longitudinally extending rail; and an inner portion horizontally extending between said pair of spaced apart sides, said inner portion being fixedly attached to both of said pair of spaced apart sides of said outer portion at horizontally spaced apart points so as to define at least one vertically extending crush zone in each of said pair of spaced apart sides between adjacent spaced apart points;

whereby the energy received from said generally longitudinally directed impact is at least partially absorb by deformation of said inner and outer portions; and wherein said inner portion is stepped in a longitudinally extending direction such that said inner portion includes first and second substantially horizontal segments vertically spaced apart from one another.

9. The impact absorbing structural assembly of claim 8, wherein said inner portion further includes an intermediate segment interconnecting said first and second substantially horizontal segments.

10. The impact absorbing structural assembly of claim 9, wherein said intermediate segment is spaced apart from both of said spaced apart sides.

11. The impact absorbing structural assembly of claim 10, wherein said inner portion further includes tip forwardly and downwardly extending from said second horizontal portion.

12. The impact absorbing structural assembly of claim 7, further comprising a pair of transversely extending mounting flanges for attaching the bumper to the assembly.

13. An impact absorbing structural assembly for a motor vehicle having a longitudinally extending rail and a bumper, the impact absorbing structural assembly comprising:

an outer portion having a pair of spaced apart sides extending in a substantially longitudinal direction, each of said pair of spaced apart sides adapted to be fixedly interconnected to the longitudinally extending rail; and an inner portion horizontally extending between said pair of spaced apart sides, each of said inner portion having a substantially horizontal segment;

whereby the energy received from said generally longitudinally directed impact is at least partially absorbed by deformation of said inner and outer portions; and wherein said substantially horizontal segment is fixedly attached to each of said pair of spaced apart sides at two spaced apart points so as to define a vertically extending crush zone in each of the pair of spaced apart sides, and further wherein said horizontal segment is formed to include first and second slots transversely extending from said vertically extending crush zone in each of said pair of spaced apart sides.

14. In combination with a motor vehicle, an impact absorbing arrangement comprising:

a transversely extending bumper; and a pair of substantially identical bumper mounting units attached the vehicle frame and extending longitudinally therefrom, each said bumper mounting unit disposed adjacent said bumper and having an outer portion and an inner portion, each said outer portion having a pair of spaced apart sides extending in a substantially longitudinal direction, each said inner portion including at least one substantially horizontal segment, said at least one substantially horizontal segment being fixedly attached to each of said pair of spaced apart sides of said outer portion at horizontally spaced apart points so as to define at least one vertically extending crush zone in each of said pair of spaced apart sides between adjacent spaced apart points;

whereby an impact force of a predetermined level on said bumper is absorbed by deformation of at least one of said pair of substantially identical bumper mounting units and said outer portion further includes an arcuate segment interconnecting said pair of spaced apart sides, said arcuate seament being adapted to deform when the impact energy is received thereby and transfer a portion of the impact energy to said inner portion.

15. The impact absorbing energy arrangement of claim 14, wherein said inner portion of each of said substantially identical bumper mounting units is stepped in a longitudinally extending direction such that each said inner portion includes first and second substantially horizontal segment interdisposed by a substantially vertical segment.

16. The impact absorbing energy arrangement of claim 15, wherein said first and second substantially horizontal segments of each of said substantially identical bumper mounting units are attached to their associated spaced apart sides and each of said substantially vertical segment is spaced apart from its associated spaced apart sides.

17. The impact absorbing energy arrangement of claim 14, wherein said outer portion of each of said substantially identical bumper mounting units includes an arcuate portion interconnecting its associated pair of spaced apart sides, each said arcuate portion adapted to deform during impact and transfer a portion of the impact energy to its associated inner portion.

18. The impact absorbing energy arrangement of claim 14, wherein each of said substantially identical bumper mounting units includes a pair of transversely extending mounting flanges adapted to receive fasteners for securing said bumper thereto.

19. The impact absorbing structural of claim 13 wherein said inner portion includes a second substantially horizontal segment, said second substantially horizontal segment being fixedly attached to each of said pair of spaced apart sides at two spaced apart points so as to define a second vertically extending crush zone in each of the pair of spaced apart sides, and further wherein said second horizontal segment is formed to include first and second slots transversely extending from said second vertically extending crush zone in each of said pair of spaced apart sides.

* * * * *